(12) United States Patent
Barclay et al.

(10) Patent No.: US 8,539,341 B2
(45) Date of Patent: Sep. 17, 2013

(54) ELECTRONIC DOCUMENT READER

(75) Inventors: Duncan Barclay, Cambridge (GB);
 Steven Farmer, Cambridge (GB); Carl Hayton, Cambridge (GB); Simon Joines, Cambridge (GB); Anusha Nirmalananthan, Cambridge (GB); Paul A. Cain, Cambridge (GB); Barry Merrick, Swaston (GB)

(73) Assignee: Plastic Logic Limited (GB)

( * ) Notice: Subject to any disclaimer, the term of this patent is extended or adjusted under 35 U.S.C. 154(b) by 880 days.

(21) Appl. No.: 12/138,835

(22) Filed: Jun. 13, 2008

(65) Prior Publication Data

US 2009/0113291 A1    Apr. 30, 2009

(30) Foreign Application Priority Data

Oct. 24, 2007 (GB) .................. 0720764.0
Oct. 24, 2007 (GB) .................. 0720843.2
Feb. 15, 2008 (GB) .................. 0802816.9

(51) Int. Cl.
 *G06F 17/21*    (2006.01)
(52) U.S. Cl.
 USPC ........... 715/243; 715/247; 715/251; 715/252; 715/253; 345/1.1; 345/204; 345/206
(58) Field of Classification Search
 USPC ......... 715/243, 247, 251, 252, 253; 345/206, 345/1.1, 204
 See application file for complete search history.

(56) References Cited

U.S. PATENT DOCUMENTS 4,453,200 A   6/1984  Treka et al.
4,856,088 A   8/1989  Oliwa et al.
5,063,600 A * 11/1991 Norwood ....................... 382/186
5,347,630 A   9/1994  Ishizawa et al.
5,454,066 A   9/1995  Tsai (Continued)

FOREIGN PATENT DOCUMENTS

EP    0 283 235    9/1988
EP    1 308 825    5/2003

(Continued)

OTHER PUBLICATIONS

Ask.MetaFilter.com, "Optimal output settings when generating images for use in PowerPoint", Oct. 17, 2007, pp. 1-3 http://web.archive.org/web/20071017033447/http://ask.metafilter.com/73828/Optimal-output-settings-when-generating-images-for-use-in-PowerPoint.*

(Continued)

*Primary Examiner* — Kyle Stork
*Assistant Examiner* — Mario M Velez-Lopez
(74) *Attorney, Agent, or Firm* — Fish & Richardson P.C.

(57) ABSTRACT

We describe a method of displaying a document page with a predetermined size using a display device having edges defining lateral dimensions not substantially larger than said predetermined size and having a central re-writable display portion and a non-re-writable border, said document page comprising a central, foreground portion bearing one or both of text and graphics, a background having a background color and at least one margin having said background color, the method comprising: inputting page data defining a page for display; processing said page data to crop margins of said page such that, when displayed on said re-writable display portion, said non-re-writable border gives the appearance of said cropped margins, said processing generating cropped page data; and outputting said cropped page data for display on said re-writable display portion of said display.

19 Claims, 8 Drawing Sheets

(56) References Cited

U.S. PATENT DOCUMENTS

| | | | |
|---|---|---|---|
| 5,754,873 A * | 5/1998 | Nolan | 715/235 |
| 5,760,323 A * | 6/1998 | Romero et al. | 84/470 R |
| 5,784,487 A * | 7/1998 | Cooperman | 382/175 |
| 5,857,157 A | 1/1999 | Shindo | |
| 5,943,679 A * | 8/1999 | Niles et al. | 715/247 |
| 5,956,034 A | 9/1999 | Sachs et al. | |
| 6,248,483 B1 | 6/2001 | Aylward | |
| 6,297,945 B1 | 10/2001 | Yamamoto | |
| 6,388,877 B1 | 5/2002 | Canova, Jr. et al. | |
| 6,456,732 B1 * | 9/2002 | Kimbell et al. | 382/112 |
| 6,661,920 B1 | 12/2003 | Skinner | |
| 6,831,662 B1 * | 12/2004 | Lum et al. | 345/698 |
| 6,888,643 B1 | 5/2005 | Grimes | |
| 6,919,678 B2 | 7/2005 | Ozolins et al. | |
| 6,919,879 B2 | 7/2005 | Griffin et al. | |
| 6,954,213 B1 * | 10/2005 | Hidaka et al. | 345/589 |
| 6,961,029 B1 | 11/2005 | Canova, Jr. et al. | |
| 6,965,375 B1 | 11/2005 | Gettemy et al. | |
| 7,058,829 B2 | 6/2006 | Hamilton | |
| 7,079,111 B2 | 7/2006 | Ho | |
| 7,283,142 B2 | 10/2007 | Credelle et al. | |
| 7,289,084 B2 | 10/2007 | Lesniak | |
| 7,412,647 B2 | 8/2008 | Sellers et al. | |
| 7,425,970 B1 | 9/2008 | Gettemy et al. | |
| 7,656,393 B2 | 2/2010 | King et al. | |
| 7,743,055 B2 * | 6/2010 | Rodrigues et al. | 707/722 |
| 7,748,634 B1 * | 7/2010 | Zehr et al. | 235/492 |
| 7,760,956 B2 * | 7/2010 | Lin et al. | 382/254 |
| 7,912,829 B1 * | 3/2011 | Mathes et al. | 707/707 |
| 7,966,557 B2 * | 6/2011 | Shagam et al. | 715/243 |
| 2002/0018027 A1 | 2/2002 | Sugimoto | |
| 2002/0102866 A1 | 8/2002 | Lubowicki | |
| 2002/0149572 A1 | 10/2002 | Schultz | |
| 2003/0067427 A1 * | 4/2003 | Comiskey et al. | 345/84 |
| 2004/0008398 A1 | 1/2004 | Amundson | |
| 2004/0201633 A1 * | 10/2004 | Barsness et al. | 345/864 |
| 2004/0212588 A1 | 10/2004 | Moriyama | |
| 2004/0255244 A1 | 12/2004 | Filner et al. | |
| 2004/0268004 A1 | 12/2004 | Oakley | |
| 2005/0025387 A1 | 2/2005 | Luo | |
| 2005/0071364 A1 * | 3/2005 | Xie et al. | 707/102 |
| 2005/0206580 A1 * | 9/2005 | Koyama et al. | 345/1.1 |
| 2005/0237444 A1 | 10/2005 | You | |
| 2005/0257143 A1 | 11/2005 | Lewis | |
| 2006/0026536 A1 | 2/2006 | Hotelling et al. | |
| 2006/0029250 A1 * | 2/2006 | Karaki | 382/100 |
| 2006/0274549 A1 | 12/2006 | Fukuyoshi | |
| 2007/0024603 A1 | 2/2007 | Li | |
| 2007/0028086 A1 | 2/2007 | Oshima et al. | |
| 2007/0058178 A1 | 3/2007 | Kurihara et al. | |
| 2007/0115258 A1 | 5/2007 | Cupps et al. | |
| 2007/0195009 A1 | 8/2007 | Yamamoto et al. | |
| 2008/0238871 A1 * | 10/2008 | Tam | 345/158 |
| 2008/0297470 A1 | 12/2008 | Marsh et al. | |
| 2008/0297496 A1 * | 12/2008 | Watson et al. | 345/206 |
| 2008/0298083 A1 | 12/2008 | Watson et al. | |
| 2009/0109185 A1 | 4/2009 | Barclay et al. | |
| 2009/0109468 A1 | 4/2009 | Barclay et al. | |
| 2009/0109498 A1 | 4/2009 | Barclay et al. | |
| 2009/0113291 A1 * | 4/2009 | Barclay et al. | 715/243 |
| 2009/0113307 A1 * | 4/2009 | MacKenzie | 715/732 |
| 2009/0157847 A1 * | 6/2009 | Shibata | 709/218 |
| 2009/0219271 A1 | 9/2009 | Bandel et al. | |
| 2009/0305632 A1 * | 12/2009 | Sarkissian et al. | 455/41.2 |
| 2010/0295812 A1 * | 11/2010 | Burns et al. | 345/174 |
| 2011/0016087 A1 * | 1/2011 | Freedman | 707/617 |
| 2011/0113150 A1 * | 5/2011 | Nunnery et al. | 709/231 |

FOREIGN PATENT DOCUMENTS

| | | |
|---|---|---|
| GB | 2 214 342 | 8/1989 |
| GB | 2214342 A * | 8/1989 |
| GB | 2 446 499 | 8/2008 |
| GB | 2 446 500 | 8/2008 |
| GB | 2 454 032 | 4/2009 |
| GB | 2 454 033 | 4/2009 |
| JP | 10-027162 | 1/1998 |
| JP | 2005266968 | 9/2005 |
| JP | 2005274832 | 10/2005 |
| JP | 2006/065240 | 3/2006 |
| WO | 97/04398 | 2/1997 |
| WO | 02/095555 | 11/2002 |
| WO | 03/017245 | 2/2003 |
| WO | 03/044765 | 5/2003 |
| WO | 2004/008308 | 1/2004 |
| WO | 2004/114259 | 12/2004 |
| WO | 2006/031347 | 3/2006 |
| WO | 2006/087415 | 8/2006 |
| WO | 2007/073584 | 7/2007 |
| WO | 2009/053738 | 4/2009 |
| WO | 2009/053740 | 4/2009 |
| WO | 2009/053743 | 4/2009 |
| WO | 2009/053747 | 4/2009 |

OTHER PUBLICATIONS

Mary Millhollon; Katherine Murray, Microsoft Office Word 2003 Inside Out, Nov. 12, 2003, Microsoft Press, pp. 434-441.*
International Search Report; PCT/GB2008/050977; Feb. 19, 2009; E. Maciu.
International Application No. PCT/GB2008/050977; International Preliminary Report on Patentability (May 6, 2010).
International Search Report; GB 0802816.9; J. McCann; May 23, 2008.
www.palm.com, Palm Z22, T/X, and Tungsten E2 handhelds (copyright 2005).
www.palm.com; Palm Z22,Tland Tungsten E2 handhelds.
International Search Report; PCT/GB2008/050980; Feb. 23, 2009; E. Maciu.
Iddo Genuth: "The Future of Electronic Paper" [Online]; Oct. 15, 2007, XP002513292; http://thefutureofthings.com/articles/1000/the-future-of-electronic-paper.html.
International Search Report; GB 0802818.5; J. McCann; May 29, 2008.
Search Report; GB0802820.1; R. Jenkins; Sep. 12, 2008.
International Search Report; PCT/GB2008/050975; Feb. 20, 2009; E. Maciu.
International Search Report; PCT/GB2008/050985; Feb. 23, 2009; E. Maciu.
USPTO Office Action in U.S. Appl. No. 12/027,176, mailed Jun. 4, 2009, 12 pages.
Search Report; GB 0801987.9; May 19, 2008; D. Mackery.
Search Report; GB 0802011.7; R. Jenkins; Jun. 18, 2008.
International Search Report; GB0801998.6; D. Maskery; May 28, 2008.
Search Report and Examiner Letter for Application No. GB0802011.7 (dated Aug. 27, 2009).
Communication pursuant to Article 94(3) EPC; EP Application No. 08 806 787.1-1228; dated Mar. 23, 2011 (8 pages).
Patents Act 1977: Examination report under section 18(3); GB Application No. 0802805.2; dated Sep. 8, 2011 (3 pages).
Communication pursuant to Article 94(3) EPC; EP Application No. 08 841 838.9-1228; dated Mar. 23, 2011 (8 pages).
Patents Act 1977: Examination report under section 18(3); GB Application No. 0802816.9; dated Sep. 8, 2011 (3 pages).
Detailed First Office Action; CN Application No. 200880121962.5; dated Jul. 19, 2011 (6 pages).
Communication pursuant to Article 94(3) EPC; EP Application No. 08 806 792.1-1228; dated Mar. 23, 2011 (7 pages).
Patents Act 1977: Examination report under section 18(3); GB Application No. 0802815.1; dated Sep. 8, 2011 (4 pages).
Communication pursuant to Article 94(3) EPC; EP Application No. 08 841 371.1-1228; dated Mar. 23, 2011 (8 pages).
Patents Act 1977: Examination report under section 18(3); GB Application No. 0802818.5; dated Sep. 8, 2011 (3 pages).
Detailed First Office Action; CN Application No. 2008801224197; 6 pp [Translation].
Text of the First Office Action; CN Application No. 200880122418.2; 5 pp. [Translation].

"PDF files: dark background", Experts-Exchange.com, [accessed on May 3, 2012], 6 pages, (http://www.experts-exchange.com/Web_Development/Document_Imaging/Adobe_Acrobat/Q_21537721.html).

Examination Report in European application No. EP0802805.2, 7 pages, dated May 10, 2012.

Office Action in Chinese application No. CN200880122419.7, 2 pages of translation.

Baker, "Cropping and Rotating Pages in Acrobat," www.planetpdf.com: Creative & Print: Tips & Tricks; 2 pages, Apr. 7, 2004.

Examination Report issued on Jan. 16, 2012 in European application No. EP0802816.9, 4 pages.

Examination Report issued on Jan. 16, 2012 in European application No. EP0802815.1, 4 pages.

Examination Report issued on Jan. 16, 2012 in European application No. EP0802818.5, 4 pages.

Office Action issued on (date: xxx) in Chinese application No. CN200880122420, 6 pages of translation.

Examination Report in British application No. GB0802815.1, dated Jun. 25, 2012, 5 pages.

Examination Report in British application No. GB0802816.9, dated Jun. 25, 2012, 3 pages.

Examination Report in British application No. GB0802818.5, dated Jun. 26, 2012, 3 pages.

Office Action in U.S. Appl. No. 12/138,748, dated Mar. 6, 2012, 24 pages.

Office Action in U.S. Appl. No. 12/138,810, dated Apr. 25, 2012, 14 pages.

Office Action in U.S. Appl. No. 12/138,967, dated Jul. 20, 2012, 22 pages.

Piotr A, "Crop PDF without Adobe Acrobat and of course . . . on Unix" Bloger internet blog, posted Jan. 19, 2007, 2 pages, (http://ilikeunix.blogspot.co.uk/2007/01/crop-pdf-without-adobe-acrobat-and-of.html).

Office Action in Chinese application No. CN200880122419.7, issued on Aug. 31, 2012, 30 pages.

Office Action in Chinese application No. CN200880122419.7, issued on Aug. 31, 2012, with full translation, 40 pages.

Office Action in Chinese application No. CN2008801224182.2, issued on Mar. 19, 2013, with full translation, 27 pages.

Office Action in U.S. Appl. No. 12/138,967, issued on Apr. 12, 2013, 28 pages.

* cited by examiner

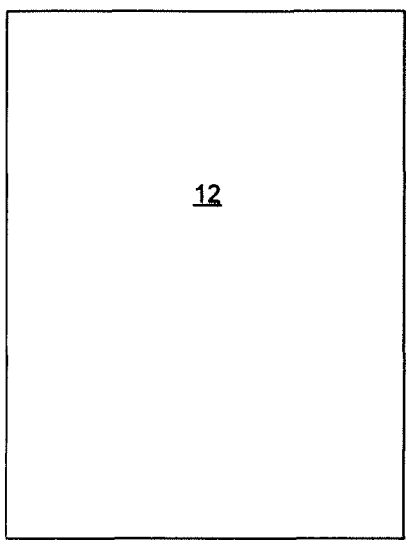
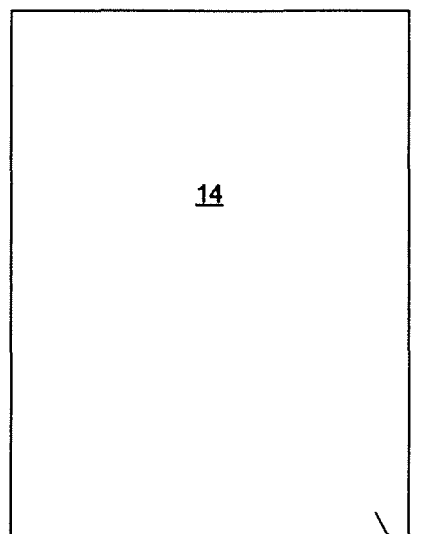
Figure 1a  Figure 1b
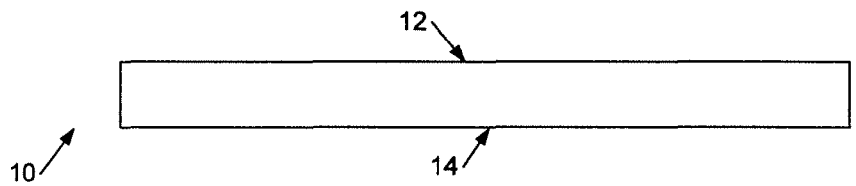
Figure 1c
| 100 | FRONT PANEL |
|---|---|
| 102 | MOISTURE BARRIER |
|---|---|
| 104 | ELECTROPHORETIC DISPLAY |
| 106 | ORGANIC ACTIVE MATRIX PIXEL DRIVER CIRCUITRY |
| 108 | SUBSTRATE |
| 110 | MOISTURE BARRIER |
112
Figure 2

ELECTRONIC DOCUMENT READER

FIELD OF THE INVENTION

This invention generally relates to an electronic document reading device, that is to a device such as an electronic book which presents a document to a user on a display to enable the user to read the document.

This application is one of a group of co-pending U.S. applications filed on the same day as this application, and with the same assignee, all hereby incorporated by reference in their entirety.

BACKGROUND TO THE INVENTION

We have previously described a form of electronic book in our earlier applications PCT/GB2006/050235 and GB 0702347.6, hereby incorporated by reference.

Background prior art relating to electronic document reading devices can be found in U.S. Pat. No. 6,124,851, US2004/0201633, US2006/0133664, US2006/0125802, US2006/0139308, US2006/0077190, US2005/0260551, U.S. Pat. Nos. 6,124,851, 6,021,306, US2005/0151742, and US2006/0119615. Prior art relating to displays can be found in EP0283235A, GB2214342A, and U.S. Pat. No. 6,831,662.

There is, however, a desire for improved electronic reading devices.

SUMMARY OF THE INVENTION

The present invention provides a method of displaying a document page with a predetermined size using a display device having edges defining lateral dimensions not substantially larger than said predetermined size and having a central re-writable display portion and a non-re-writable border, said document page comprising a central, foreground portion bearing one or both of text and graphics, a background having a background colour and at least one margin having said background colour, the method comprising: inputting page data defining a page for display; processing said page data to crop margins of said page such that, when displayed on said re-writable display portion, said non-re-writable border gives the appearance of said cropped margins, said processing generating cropped page data; and outputting said cropped page data for display on said re-writable display portion of said display.

The method enables a document to be displayed on a display comprising a non-re-writable portion, which emulates a border of the document being displayed. Preferably, therefore, the display has a front surface (or surface element) and the border of the front surface (or surface element) is coloured with said background colour on a rear face of the front surface (or surface element). Preferably, the border of front surface element is coloured by embedding coloured particles into the rear surface, and the electrophoretic display element extends beyond said re-writable portion of said display behind said coloured border, substantially flush against said rear surface at an edge of said coloured border around said central re-writable portion of said display. Preferably, the optical density of said coloured border reduces gradually towards the central rewritable portion whereby the boundary between said border and said central-rewritable portion is rendered less visible. Preferably, the background colour is substantially white so that the display surface has substantially the appearance of a piece of paper.

Thus embodiments of the method help to provide a display device in which a displayed page appears to extend right to the edge of the device without the need for very sharp bends in flexible circuit board or wiring connecting to edges of the re-writable portion of the display. This is because by cropping the edges of a page prior to displaying the apparent margins of the page are provided by the non-re-writable borders of the display device whilst the actual edge(s) of the rewritable display to which connections are made lie within the apparent edges of the displayed page.

Preferably, said lateral dimensions of the display device are within 1 cm to that of a standard paper size, in particular ISO 216 or ANSI/ASME Y14.1. Preferably, said central foreground portion displayed on said central rewritable portion extends to a distance of less than 5 mm away from the non-rewritable border.

In some preferred embodiments such a method (and a method as described later below) is implemented in another (host) computer system from which the display device receives processed, cropped page data. In embodiments the page cropping procedure is implemented using a printer driver of the (host) computer system.

Preferably, said central re-writable display portion comprises an electrophoretic display element. In embodiments of the method the display device is not completely rigid, having at least a degree of flexibility to impart robustness to the device.

Preferably, processing said page data further comprises formatting a layout of one or both of said text and graphics of said document page such that said text and graphics are displayable on said re-writable display portion. The page data may be received from a device such as a laptop computer, desktop computer, Personal Digital Assistant (PDA), mobile telephone or smart telephone, either as page data for cropping by said display device or as pre-cropped page data, preferably in the form of page image data. The page data is preferably stored in a non-volatile memory store of the display device.

The present invention also provides a method of driving a paper-emulation display; the display having a re-writeable electrophoretic display area bordered by a non-displaying surface coloured to match a background colour of said electrophoretic display area, the method comprising inputting page data defining a page for display, processing said page data to crop margins of said page such that when displayed on said electrophoretic display said non-displaying surface gives the appearance of said cropped margins, said processing generating cropped page data, and outputting said cropped page data for display on said electrophoretic display area of said paper-emulation display.

Again, preferably, the above method is implemented in a host computer system, preferably using a printer driver.

Preferably, said paper-emulation display comprises a non-volatile display. Preferably, said re-writeable electrophoretic display area is track sensitive, the method further comprising inputting touch data from said display, generating mark-up data representing a marked-up version of said page, and outputting said mark-up data.

The present invention also provides a method of displaying a document page with a predetermined size at substantially 1:1 scale using a display device having edges defining lateral dimensions not substantially larger than said predetermined size and having a central re-writable display portion and a non-re-writable border, said document page comprising a central, foreground portion bearing one or both of text and graphics, a background having a background colour and at least one margin having said background colour, the method comprising: inputting page data defining a page for display; processing said page data to crop margins of said page such that, when displayed on said re-writable display portion, said non-re-writable border gives the appearance of said cropped margins, said processing generating cropped page data; and outputting said cropped page data for display on said re-writable display portion of said display.

The predetermined page size may be a standard size such as an international standard ISO216 size (for example an A-series size such as A4 or A5, a B-series size such as B4 or B5 or a C-series size) or a substantially equivalent DIN, SIS of JIS size; or a North American standard size such as AWS1 Y14.1 (for example, letter, legal and the like). The substantially 1:1 scale may include a scale in one or both dimensions down to 0.9:1, 0.8:1 or 0.7:1.

In embodiments this enables a device of, say, A4 size to display a page at substantially 1:1 scale on a device not substantially larger than the page size, in this example, A4 size. This is because the display can be smaller than (say) A4, the borders of the display giving substantially the same impression as the (background) of the display screen. This in turn, enables a viewer to have the impression that the displayed page extends right to the edges of the display device. (It will be understood that in this specification references to a (background) colour include black, grey and white).

In some preferred embodiments the processing to crop the margins of a displayed page comprises a determining, for a set of pages of a document, a minimum margin size for, preferably each of top, bottom, left and right margins. This minimum margin size determines the amount which can safely be cropped from each of the respective margins without losing any information on a page. Preferably, therefore, in this context a margin is that portion of a page which, amongst the pages of a document for display, has information which does not substantially change from one page to the next. Typically this is a "white space" part of a page. Thus it will be appreciated that changing information such as a page number is not included in the margins since this information is preferably displayed on the re-writable portion of the display since it changes from one page to the next. Preferably the margin comprises a blank space on a page, that is a region of the page where there is substantially no information content (theoretically, in embodiments, information which does not change from one page to the next such as logo could be defined permanently in the non-rewriteable border). The cropping may comprise removing edge portions of an image of a page and then, preferably, resealing the page to compensate for the cropping.

Thus, in a further aspect the invention provides a method of formatting a document for display on an electronic document reader having a non-rewriteable border adjacent a re-writable display portion, the method comprising: inputting page data for a plurality of pages of said document for display on said electronic document reader; processing said page data to determine, for each of said plurality of pages, a margin size of at least one margin of each of said pages; identifying a smallest said margin size from amongst said determined margin sizes; scaling, using said smallest margin size, said page data for display on said re-writable display portion.

Preferably the scaling comprises scaling the page data such that a page with said smallest margin size substantially completely fills the re-writable display portion when margin(s) of that page being displayed is (are) discounted—that is displaying the information on the page substantially completely fills the re-writable display portion of the display and the appearance of the margins of that page are provided by the border(s) of the display device.

In some preferred embodiments of the technique the page data is in the form of image data defining an image of a page. This facilitates display almost any type of information since blank space margins can be identified by image processing. This in turn facilitates implementation of a technique in a printer driver, thus making the technique agnostic to the type of information displayed or the source of the information (word processor, image processor, music processor, e-mail, web pages, or any other source of printed information). Embodiments of the technique may therefore accept imaged data from a printer driver, for example incorporated within another electronic device, or the technique may be implemented within the printer driver itself, thus reducing the processing load on the electronic document reader and saving power. In still other embodiments, however, the page data may include explicit page layout information for processing.

In preferred embodiments of the technique a pages is scaled so that when it is displayed at least one element of information which changes from one page to another substantially abuts an edge of the rewritable display portion adjacent the non-rewritable border. For a top margin this may comprise, for example, a page number. In other implementations or for example, at the option of a user, information of this type may be omitted from the display to provide a closer to a 1:1, paper-like representation of a displayed page. In this case, for a document, the margins may be defined by one or more boundaries or a boundary box of words or other information content on the page rather than by material which is in a header and/or footer or which is in what a word processor might define as a margin of the page.

Optionally to reduce processing load on electronic document reader a default scaling or cropping may be applied to the page, for example based upon a previously determined (learnt) scaling or cropping.

The invention further provides processor control code to implement the above-described methods, for example on a general purpose computer system or on a digital signal processor (DSP). The code may be provided on a carrier such as a disk, CD- or DVD-ROM, programmed memory such as read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

In a related aspect the invention provides an electronic document reader for displaying a document page with a predetermined size, the electronic document reader having edges defining lateral dimensions not substantially larger than said predetermined size and having a central re-writable display portion and a non-re-writable border, said document page comprising a central, foreground portion bearing one or both of text and graphics, a background having a background colour and at least one margin having said background colour; and wherein the electronic document reader is configured to input page data defining a page for display; process said page data to crop margins of said page such that, when displayed on said re-writable display portion, said non-re-writable border gives the appearance of said cropped margins, said processing generating cropped page data; and output said cropped page data for display on said re-writable display portion of said display.

In a further related aspect the invention provides an electronic document reader having a non-rewriteable border adjacent a re-writable display portion, the electronic document reader further comprising: an input to receive page data for a plurality of pages of said document for display on said electronic document reader; non-volatile memory for storing said page data; program memory for storing processor control code for controlling said electronic document reader; a display for displaying a said page of said document; and a processor coupled to said non-volatile memory to said program memory, to said input, and to said display, and wherein said processor control code is configured to control said processor to: process said page data to determine, for each of said plurality of pages, a margin size of at least one margin of each of said pages; identify a smallest said margin size from amongst said determined margin sizes; scale, using said smallest margin size, said page data for display on said re-writable display portion; and provide said scaled page data for displaying on said display.

Features of the above described aspects and embodiments of the invention may be combined in any combination.

BRIEF DESCRIPTION OF THE DRAWINGS

These and other aspects of the invention will now be further described by way of example only, with reference to the accompanying figures in which:

FIGS. 1a to 1c show, respectively, a front, display face view, a rear view, and a vertical cross-section view of an electronic document reading device according to an embodiment of the invention;

FIG. 2 shows a detailed vertical cross-section through a display portion of the device of FIG. 1;

FIG. 4b shows a cross section through the edge of the device for FIG. 4a;

DETAILED DESCRIPTION OF PREFERRED EMBODIMENTS

Figure 3A:
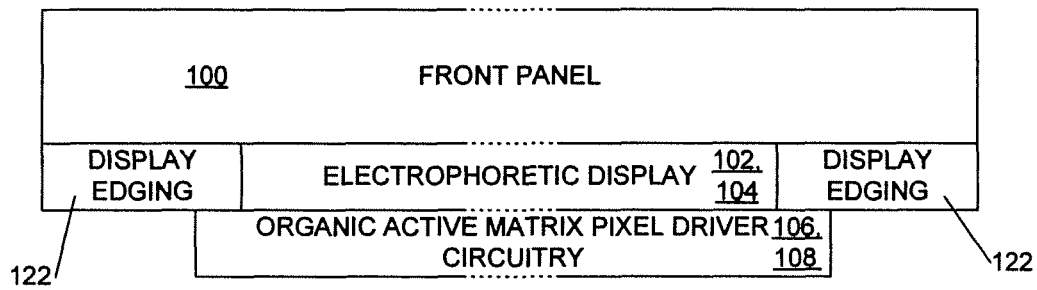
FIGS. 3a and 3b illustrate display edging for the device of FIG. 1.

Referring to FIGS. 1a to 1c, these schematically illustrate an electronic document reading device 10 having a front display face 12 and a rear face 14. As can be seen from FIG. 1c, in preferred embodiments the display surface 12 is substantially flat to the edges of the device and, in particular, lacks a display bezel. However in embodiments described later it will be seen that the electronic (electrophoretic) display does not extend right to the edges of the display surface 12, and rigid control electronics are incorporated around the edges of the electronic display, this approach reducing the overall thickness of the device and thus facilitating flex-tolerance, at the expense of making the overall area of the device slightly larger.

Referring now to FIG. 2, this illustrates a vertical cross-section through a display region of the device between the frame members 16. The drawing is not to scale.

As can be seen, in preferred embodiments the device has a substantially transparent front panel 100, for example made of Perspex (®), which acts as a structural member. The active matrix pixel driver circuitry layer 106 may comprise an array of organic or inorganic thin film transistors as disclosed, for example, in WO01/47045. Such a front panel is not necessary and sufficient physical stiffness could be provided, for example, by the substrate 108 optionally in combination with one or both of the moisture barriers 102, 110.

The illustrated example of the structure comprises a substrate 108, typically of plastic such as PET (polyethylene terephthalate) on which is fabricated a thin layer 106 of organic active matrix pixel driver circuitry. Attached over this, for example by adhesive, is an electrophoretic display 104, although alternative display media such as an organic LED display medium or liquid-crystal display medium may also be used. A moisture barrier 102 is provided over the electronic display 104, for example of polyethylene and/or Aclar™, a fluoropolymer (polychlorotrifluoroethylene-PCTFE). A moisture barrier 110 is also preferably provided under substrate 108; since this moisture barrier does not need to be transparent preferably moisture barrier 110 incorporates a metallic moisture barrier such as a layer of aluminium foil. This allows the moisture barrier to be thinner, hence enhancing overall flexibility.

Approximate example thicknesses for the layers are as follows: 100 μm for moisture barrier 110, 200 μm for substrate 108, 5-6 μm for active layer 106, 190 μm for display 104, and 200 μm for moisture barrier 102. The set of layers 102-110 form an encapsulated electronic display 112; preferably this is bonded, for example by adhesive, to a transparent display panel 100. The front panel 100 may have a thickness in the range 0.5-2 mm, for example approximately 1 mm.

Surprisingly it has been found that the presence of the front panel 100 has little effect on the overall visual appearance of the display, in particular the contrast ratio. It is speculated that this is because although whites become slightly greyer, black becomes slightly blacker.

As mentioned above, the active area of the display does not extend to the edge of the display surface, which enables the electronics to control the active display to be placed around the edge of the reading device.

Referring to FIG. 3a, this schematically illustrates a display edging arrangement (the illustration is simplified, and not to scale). As shown the display edging 122 is provided around the perimeter of the electrophoretic display 104. This display edging is coloured to substantially match the colour of the active display area 104, which gives the appearance that the reader is a single display extending to the edges of the reader device. Thus in embodiments a boundary between the active display area and its border (forming margins of a displayed page) is at least partially concealed and may be substantially invisible.

In an embodiment, the display edging may comprise a simple border which may be, for example, sprayed onto the front panel 100. However in other embodiments to provide a uniform appearance to a user display edging 112 may comprise electrophoretic display material such as an additional, undriven sheet of electrophoretic display or an undriven lateral extension of electrophoretic display 104.

Figure 3B:
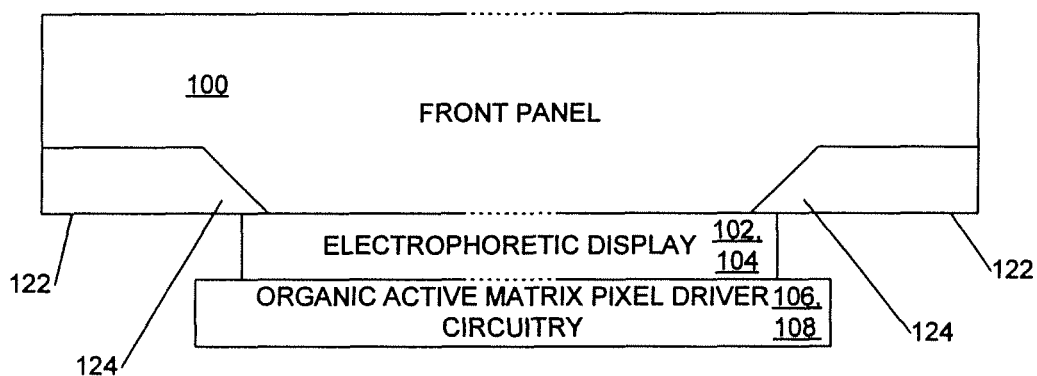

FIG. 3b shows an alternative embodiment of the display, which comprises a display edging 122 that forms part of the front panel 100. Techniques such as dye sublimation are used to embed the transparent front panel with coloured particles.

Other techniques for embedding coloured particles into the material of the transparent front panel 100 may be used.

A tapered portion 124 of the embedded particles, where the depth of penetration of the particles into the front panel decreases as the distance from the edge (towards the centre of the device) increases, provides a gradual fade from the display edge to the active display. Such a taper provides a softer edge between the display edge and the active display, which further helps to create the illusion that the active display extends to the edge of the reading device.

Further, the device comprises a visual continuation between the border of the device and the display, such that the display is flush to the border of the device. The visual continuation of the two components (the border and the display) is such that the appearance of a material continuation between the two components is also provided.

In embodiments, the electronic document reader comprises connectors located along an edge of the device to enable the device to be connected to other electronic devices, such as a laptop or desktop computer, a PDA (Personal Digital Assistant), a mobile phone or 'smart' phone, or other such devices. A USB (universal serial bus) or similar connector is, for example, provided. However, in embodiments, the electronic document reader may also be provided with wireless interfaces (for example a infrared or Bluetooth™ or other such interfaces). Such connections enable documents to be transferred to and from the electronic document reader.

The device may also include a number of user controls for selecting documents and/or pages, turning pages forward and back and the like. In embodiments, the border around the active display comprises touch sensitive elements. However in other embodiments the display may be touch sensitive, for example as described in our co-pending international patent application PCT/GB2006/050220 hereby incorporated by reference in its entirety. Such sensors may include capacitive sensors or resistive touch sensors. The aforementioned patent application describes an arrangement in which a touch-screen component is positioned below the display, but which is nonetheless operable from the front, display surface, in particular by laminating the display medium and display backplane over a resistive touch-screen (using a pressure sensitive adhesive). However the skilled person will appreciate that other forms of touch-screen technology may additionally or alternatively be employed. In such embodiments, documents may be electronically "marked-up", with mark-up data being written to or being associated with the electronic document being displayed.

Figure 4A:
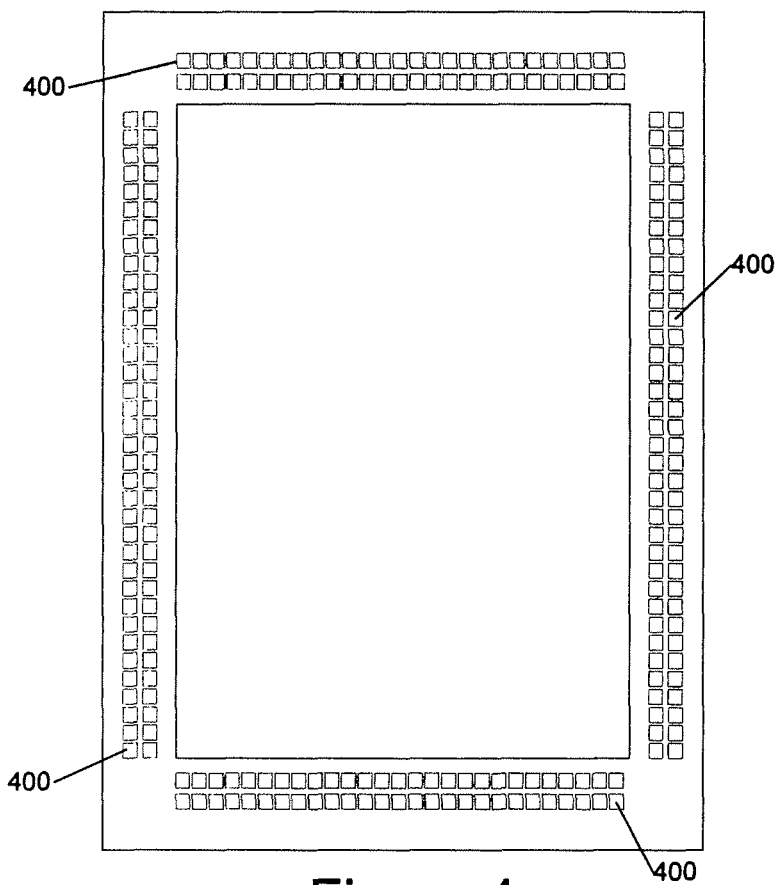
FIG. 4a shows a device having a border comprising touch sensitive elements.

As mentioned above, embodiments may have a border comprising touch sensitive elements 400, as shown for example in FIG. 4a. Such elements may provide a number of user controls for selecting documents and/or pages, turning pages forward and back and the like. The touch sensitive elements may be arranged around one or more of the borders of the device. The touch sensors may be arranged such that location agnostic gestures are enabled, wherein a user may perform the same gesture at any point around the border to produce the same result, is particular independent of orientation (portrait or landscape) of the device.

Figure 4B:
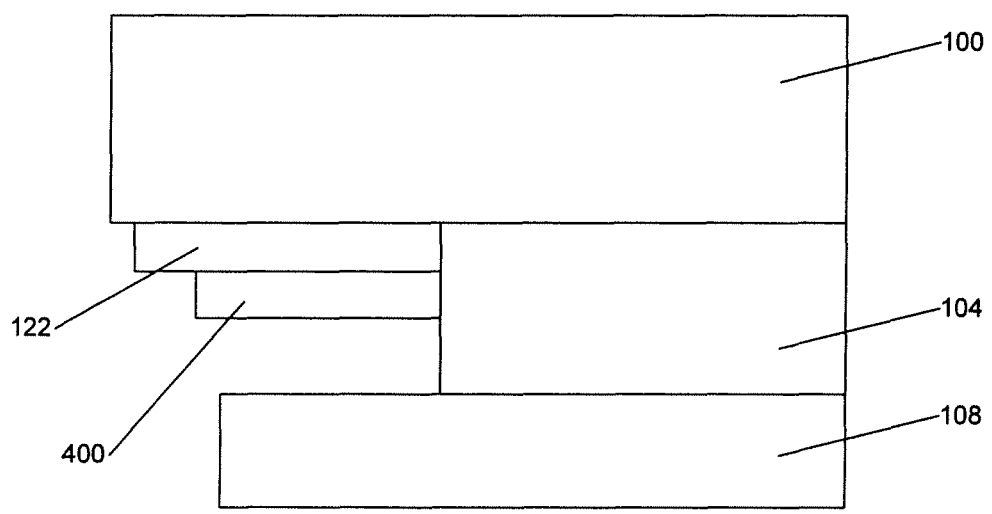

FIG. 4b shows a cross section through the edge of a device. To form such touch sensors, a conductive layer 400 of the touch sensor is patterned on the underside of the border 122. The upper conductive layer is patterned to produce a sensor array, which is formed of a design so as to enable touch sensitive gestures to be provided, both in a horizontal and vertical direction. The upper conductive layer may be a conductive polymer or preferably a metallic layer, such as, but not limited to copper, nickel, gold or silver or alternatively a printable metal. The conductive layer maybe deposited using techniques such as vacuum deposition, electroplating and printing techniques, such as screen printing.

An insulator material layer is then deposited over the upper conductive layer, by techniques such as but not limited to, spray or blade coating or printing techniques. A lower conductive layer is then deposited over the dielectric layer and patterned, as above. The lower conductive layer forms the ground plane and may also form the tracking plane. Alternatively, a separate conductive layer may be deposited and patterned as above to form the tracking plane, separated from the adjacent conductive layer by a further layer of dielectric material.

Via hole interconnects are formed between the sensor array and the tracking plane, in order to connect these two layers electrically. The tracking plane is then in turn connected to the electronics of the device.

There are several ways that the connection may be formed between the upper conductive layer and the electronics of the device. Such connections may be formed mechanically, with the aid of an adhesive or through a welding process.

As mentioned above, in preferred embodiments the display medium is a reflective display medium, in particular an electrophoretic display medium and the backplane comprises a flexible substrate such as PET or PEN (polyethylene naphthalene). Preferably the backplane is fabricated using solution-based transistors preferably patterned by techniques such as direct-write printing, laser ablation or photolithography. Further details can be found in the applicant's earlier patent applications, including, in particular, WO 01/47045, WO 2004/070466, WO 01/47043, WO 2006/059162, WO 2006/056808, WO 2006/061658, WO 2006/106365 and PCT/GB2006/050265, all hereby incorporated by reference in their entirety.

Figure 5:
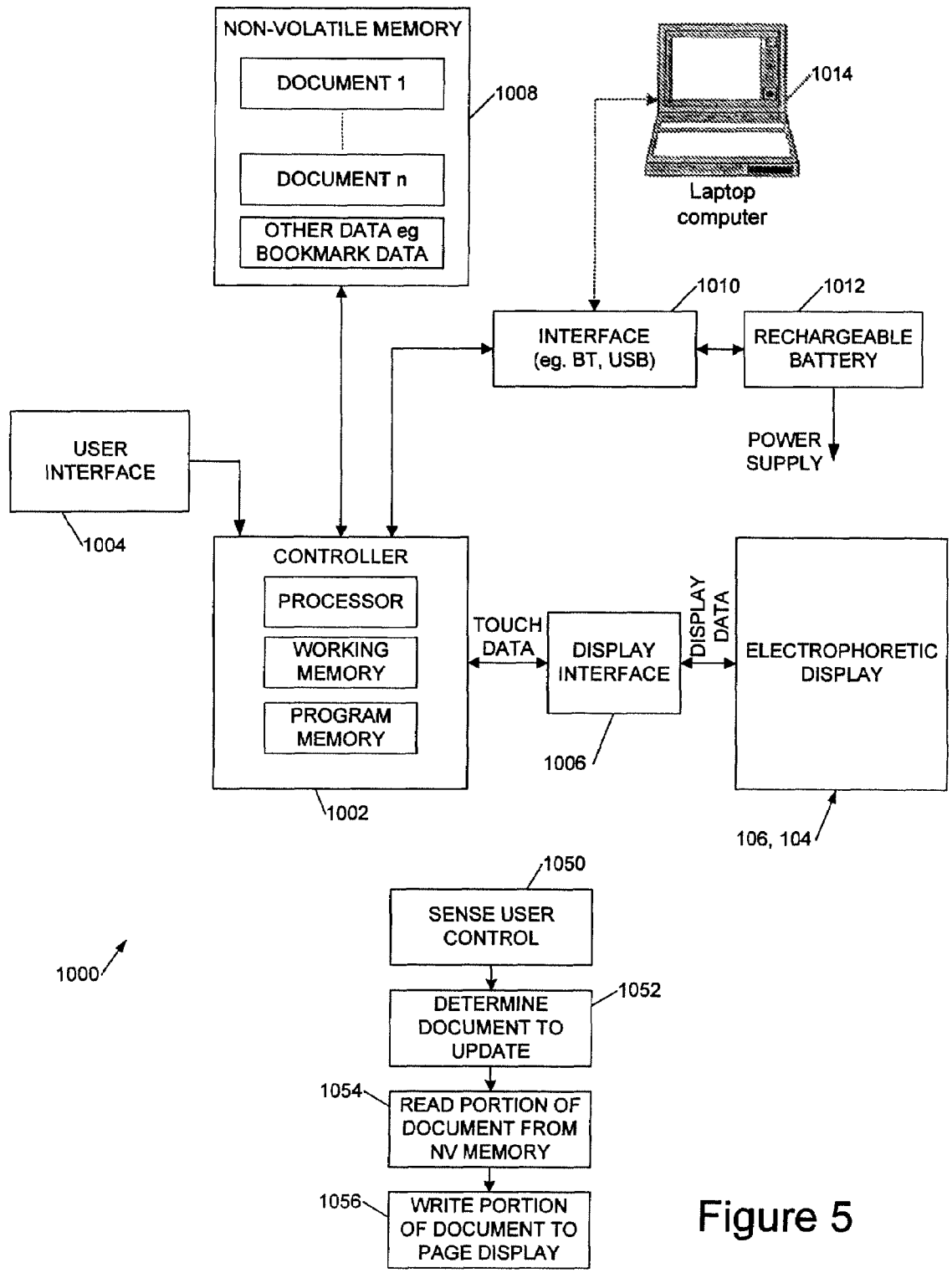
FIG. 5 shows a block diagram of control electronics for an electronic document reader according to an embodiment of the invention.

Referring now to FIG. 5, this shows example control circuitry 1000 suitable for the above-described electronic document reader 10. The control circuitry comprises a controller 1002 including a processor, working memory and programme memory, coupled to a user interface 1004 for example for controls 130. The controller is also coupled to the active matrix driver circuitry 106 and electrophoretic display 104 by a display interface 1006 for example provided by integrated circuits 120. In this way controller 1002 is able to send electronic document data to the display 104 and, optionally, to receive touch-sense data from the display. The control electronics also includes non-volatile memory 1008, for example Flash memory for storing data for one or more documents for display and, optionally, other data such as user bookmark locations and the like. An external interface 1010 is provided for interfacing with a computer such as laptop, PDA, or mobile or 'smart' phone 1014 to receive document data and, optionally, to provide data such as user bookmark data. The interface 1010 may comprise a wired, for example USB, and/or wireless, for example Bluetooth™ interface and, optionally, an inductive connection to receive power. The latter feature enables embodiments of the device to entirely dispense with physical electrical connections and hence facilitates inter alia a simpler physical construction and improved device aesthetics as well as greater resistance to moisture. A rechargeable battery 1012 or other rechargeable power source is connected to interface 1010 for recharging, and provides a power supply to the control electronics and display.

The skilled person will appreciate that processor control code for a wide range of functions may be stored in the programme memory. By way of example a simple document display procedure may comprise, in operation, sensing a user control 1050, determining which document to update 1052, reading a portion of the relevant document from the non-volatile memory 1054, and writing the read portion of the document to the page display 1056.

As discussed above, electronic documents to be displayed on the reader may come from a variety of sources, for example a laptop or desktop computer, a PDA (Personal Digital Assistant), a mobile phone (eg Smart Phones such as the Blackberry™, or other such devices. Using the wired (eg USB etc) or wireless (eg Bluetooth™) interfaces, the user can transfer such electronic documents to the document reader in a variety of ways. Electronic documents may comprise any number of formats including, but not limited to, PDF, Microsoft Word™, Bitmaps, JPG, TIFF and other known formats.

There are three main ways in which the transfer of files may occur.

A first is the act of transferring the file from a device, such as a mobile phone or a smart phone to the reader. Once transferred, the file is then displayed on the reader. A second method of transfer is the synchronisation of documents between the reader and a device, as long as the reader is connected to a device such as a laptop. The same document is therefore available on both devices. A third method of transfer is the act of printing the document from a device such as a laptop or PC onto the reader. The image of the document is therefore transferred to the reader. These methods will now be described in more detail.

In a first method, electronic documents are stored in a separate laptop or desktop computer, PDA or 'smart' phone. The user then connects the electronic document reader to any of the above devices using the wired or wireless interfaces to synchronise the reader to the devices. During this synchronisation, electronic documents that are stored in any number of user-defined folders defined on the computer, PDA device or 'smart' phone, and that are not present in the memory of the reader are transferred to the reader. Similarly, any documents not present on the computer, PDA or 'smart' phone that are present on the reader (for example, documents that have been modified or written to whilst displayed on the reader) may also be transferred back to the computer, PDA or 'smart' phone.

In such a method, the Personal Computer (PC) takes control of the device and transfers data to and from the device. To understand the capabilities of the device, the PC may require several software components to be installed, for example, a printer driver; a device driver (to manage the details of the communications protocol with the device) and a controlling management application.

A second method of transferring the documents is similar to the first, in that documents between a computer, PDA or 'smart' phone are synchronised with the documents present in the memory of the reader. However, before the transfer begins (using the wired or wireless interfaces), the user may select which documents are synchronised. This may be achieved, for example, using a document management programme running on the computer, PDA or 'smart' phone. The user indicates a selection on the computer, PDA or 'smart' phone and only those files are synchronised. Alternatively, a live synchronisation may be performed, where the reader could store all documents that have been recently viewed on the computer, PDA or 'smart' phone.

A third method of transferring electronic documents to the reader from a computer, PDA-type device or 'smart' phone involves the use of an intermediary module to convert the electronic document into a suitable format for displaying on the display. In such a method, the user "prints" the document to the reader so that the "printed" document is displayed on the active display of the reader. The intermediary module may include, amongst others, a printer driver module.

Embodiments of the method use the intermediary module (which is preferably a printer driver) to generate an image file of each page within a document being printed. These images may be compressed and stored in a native device format used by the electronic reader. These files are then transferred to the electronic reader device as part of a file synchronisation process.

One of the advantages of this technique is that it allows support for any document/file for which the operating system has a suitable intermediary application, such as a printer driver, installed. During the file synchronisation sequence the control program looks at each document and determine whether the operating system associates an application with that file, for example, a spreadsheet application will be associated with a spreadsheet document. The control application invokes the associated application and asks it to 'print' the document to the device printer. The result will be a series of images in the device format corresponding to pages of the original document and will appear on the electronic reader, as if the document had been printed.

The intermediary module may reside in the computer, PDA or 'smart' phone printing the document, or reside in the document reader. Once a document has been selected for printing to the reader, the intermediate module processes the electronic document to enable the document to be displayed on the reader or on a remote server connected to the PC, PDA or 'smart' phone. Processing may include adjusting or cropping margins, reformatting or repaginating text, converting picture elements within a document into a suitable displayable content, and other such processes. In embodiments, the intermediate module may, for example, be a device programme such as a printer driver.

A fourth method of transferring electronic documents to a reader involves the use of Smart or mobile telephones that are capable of receiving and reading documents (whether attached to or embedded in a message), for example the Blackberry™. In such a method, the act of "opening" a document within the telephone processes and transfers the electronic document to the reader for displaying. Again, this method of opening a document may utilise an intermediary module to process the document, as described above.

In such a method, the device may receive the documents via a wireless link such as Bluetooth™. A Bluetooth equipped 'smart' phone transfers files stored in its internal memory to the device. On receipt of such a file, if the file consists of a file format supported natively by the device, the device renders the pages from the document to store in the device memory. As soon as the first page is available, the file will be displayed on screen of the device. Alternatively, the pages of the file may be rendered before transmission to the device. Further, a remote server may be accessed by a intermediary device, such as a PDA or a mobile or smart phone. The information received by the intermediary device may be stored on such a device, before sending the document on to the reader device.

Alternatively, the reader may be used as a storage device, for example, in the form of a USB memory stick. Documents of interest may be transferred to the reader for the user to access at a later date.

The active display area and (inactive) display edging are arranged to provide the user with the appearance of a screen with a border or margin. Furthermore, in embodiments, the document reader is dimensioned such that a page of an A4 document (ISO 216), or a document in a US letter (ANSI/ASME Y14.1) format, or any standard paper size, may be displayed at a 1:1 scale. Such an arrangement provides the user with a document reader that therefore mimics the appearance of a printed sheet of A4 or US letter (or other like document formats).

However, electronic documents for displaying on the document reader generally comprise an unused border or margin around the edge of the text. If such a document were to be presented on the display of the reader, there would be an unwanted and unnecessary border or margin around the document being displayed. There is therefore a need to remove this unwanted margin from the electronic document. Such a removal of unwanted border or margin from the electronic document would advantageously maximise the use of the active display area. The display edging therefore becomes the border or margin that be present.

In addition to the reader, there is therefore also provided a cropping module that is configured to process the electronic document to remove the unwanted border around the text present in the document. The cropping module may reside in the reader or the device from which the document is being transferred. In some preferred embodiments it is performed by a pre-rendering process implemented on another computer system from which the display device receives electronic document pages for display. This is described in more detail in the applicant's co-pending patent application no. filed by the applicants on the same day as this application (our ref GBP291004, incorporated by reference).

A device may be made such that the overall layout resembles standard paper sizes, such as A4 or US letter. However, the active display part of such a device cannot extend to the border of the device due to the electronics required to drive that display.

When showing a document on such a display there are several possibilities:

Show the document at actual size. In this case, the edge of the document will be lost to view as it will correspond to the area of the device that hides the electronics. However, this is unlikely to be satisfactory as the lost area may include text or images that form part of the document.

Scale the document to the active display area. In this case, the whole document is shown, but will be reduced in size significantly.

Process the document to analyse how much margin area there is on a document and scale the document such that only this margin area is lost behind the electronics. In this case, no information is lost and the maximum size of content is retained.

In order to generate the images for this latter choice, it is necessary to process the whole document. It is important when viewing the document on the device that any scaling factor applied to a page of the document is retained throughout the whole document. This avoids the issue where the text would grow or shrink as the user changes page.

In the general case, the process knows nothing about the structure or content of a document. In order to generate the information, it is necessary to process the document in two passes. The first pass will "print" the document to a series of images; each image representing a single page. On each page, the largest margin on each of the four sides is determined. For each side, the smallest of the set of pages is retained. So for example, if on page 1, the top margin is 10 mm and on page 2 the top margin is 20 mm, we retain 10 mm as the smallest of the largest margin available.

At the end of the first pass, sizes are available for each of the margins. A simple calculation will work out a (proportionally correct) scale factor that will allow content on any page in the document to be shown in the active display area of the device. The scale should be adjusted to ensure that it never makes the text larger than life-size (1:1 scale). This value is used to run the document through a second pass of printing, to optimise the print for the display.

Figure 6A:
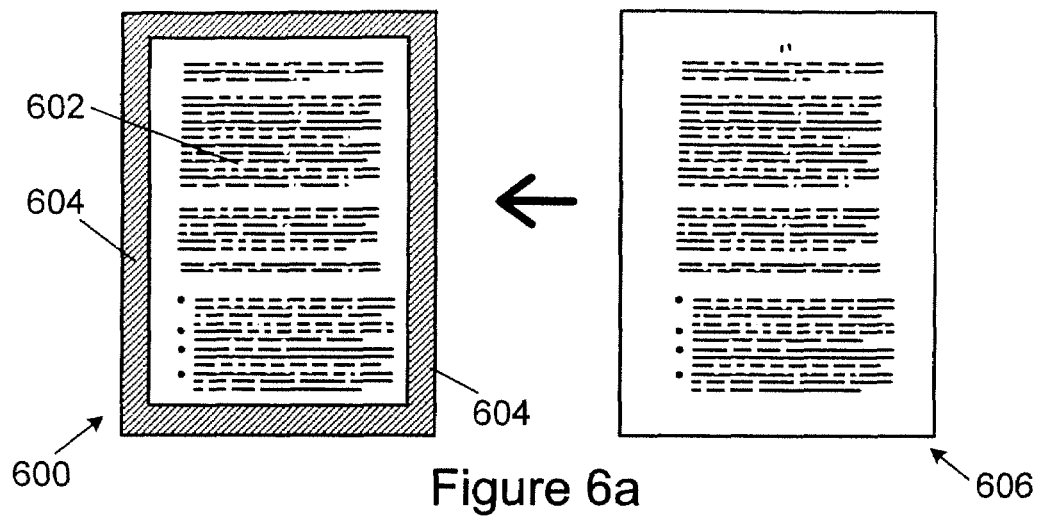
FIGS. 6a to 6c show examples of fitting document pages to a re-writable display portion of an electronic document reader.

Referring now to FIG. 6 this shows an electronic document reading device (paperless printer) 600 with a re-writeable electrophoretic display portion 602 and a border region 604 (in FIG. 6 the border is shaded for clarity; in reality it is matched to the re-writeable display area so as to appear like a continuation of the display area). A typical printed document has one or more pages 606, each page of which will have a margin on each of the top, bottom, left and right side which contains no content.

Figure 6B:
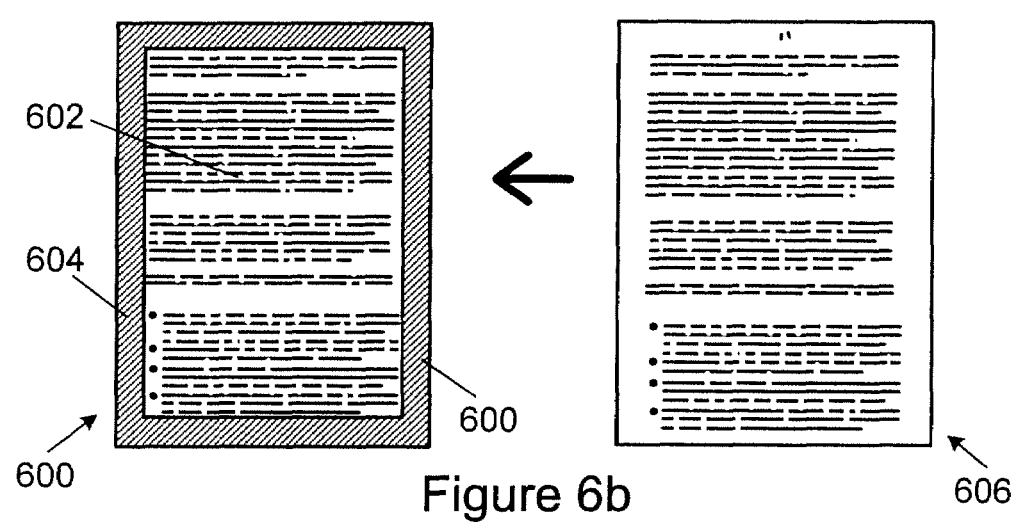
Figure 6C:
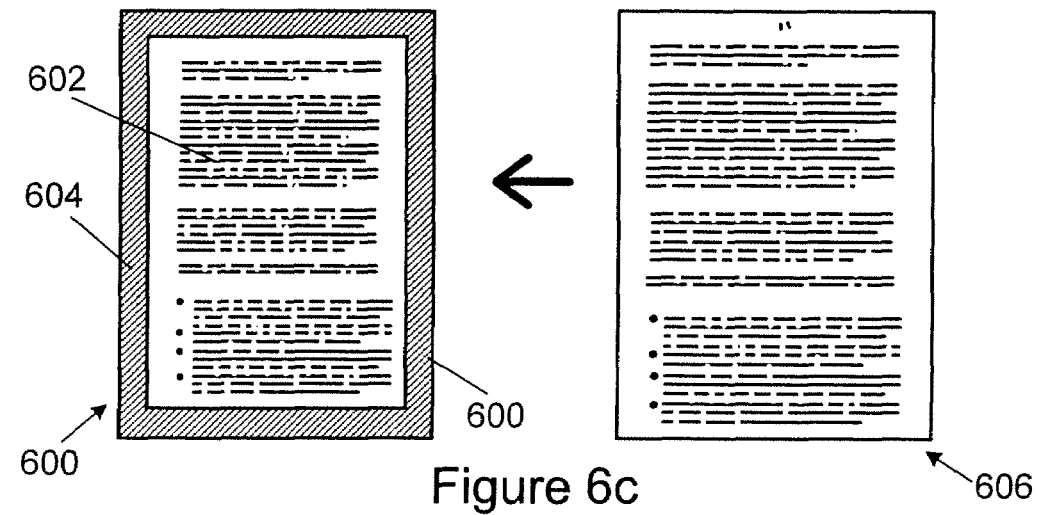

In an ideal situation (FIG. 6*a*), the size of the margins would be at least the same size as the display edging of the reader. If such a page is displayed on the reader at the same size as it would be printed on a conventional printer (a preferred default setting of the device), then the reader will not lose any content (the margins correspond to the non re-writeable display area). However, in general not all the pages will meet this requirement: Their margins are likely to be smaller than the device edging, and in this case part of the content will be obscured as shown in FIG. 6*b*. Therefore, it is desirable to reduce the physical page size, to display all of the content, as shown in FIG. 6*c*.

In a general case the process for analysing a document knows nothing about the structure of the document and determines, the margin information it uses from images of the pages. In an embodiment these images are created using a program which is configured to appear to an application like a (printer driver) program for regular printer page generation. However, at the end instead of sending a printer command set to a printer, it creates a bitmap image on disc.

Figure 7:
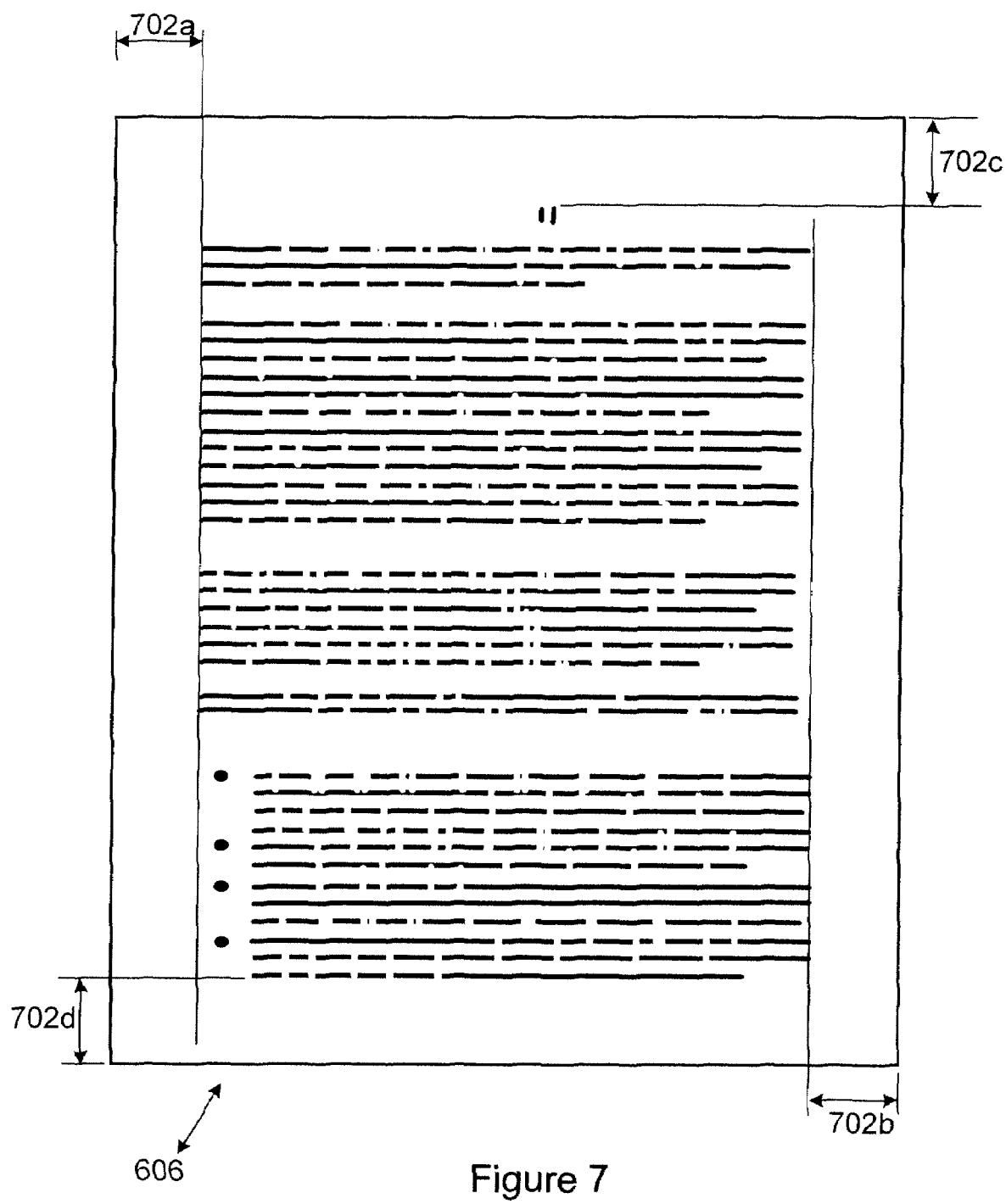
FIG. 7 shows margins of an example document page.

A management application program then loads this image and examines the image and determine what the margins 702*a-d* are, as shown in FIG. 7. The skilled person will appreciate that the determination these margins for a page is relatively straightforward. The page image can be then recreated to a size that allows the actual content to be optimally fitted to the resolution of the active display area.

If first image generation pass could be created with the "correct" scaling factor, this would remove the need to run the computationally expensive process again for the second pass. It is possible to make a reasonable guess based upon previous knowledge of document types. This can take advantage of the fact that many users set their margins once in their word processor and use those settings for all documents. Embodiments of the process may then "learn" that setting, optimally separately for each user of a device.

However it is possible, often likely, that many pages within a document have different margins. This would provide a poor reading experience if each page were scaled individually. For example, as the reader changed pages the same 12 pt font could be rendered at any size from 100% of the print equivalent down to 70% of the original. It is thus desirable to apply the same scaling to the whole document. To achieve this, rather than look at the margins of a single page preferably substantially every page is examined. For each of the left, right, top and bottom margins the process finds the smallest measured value found throughout the whole document. These values can then be used to re-parse the whole document to an optimal scaling to suit the display, that is a scaling in which the largest actual content size just fits on the re-writable portion of the display.

Figure 8:
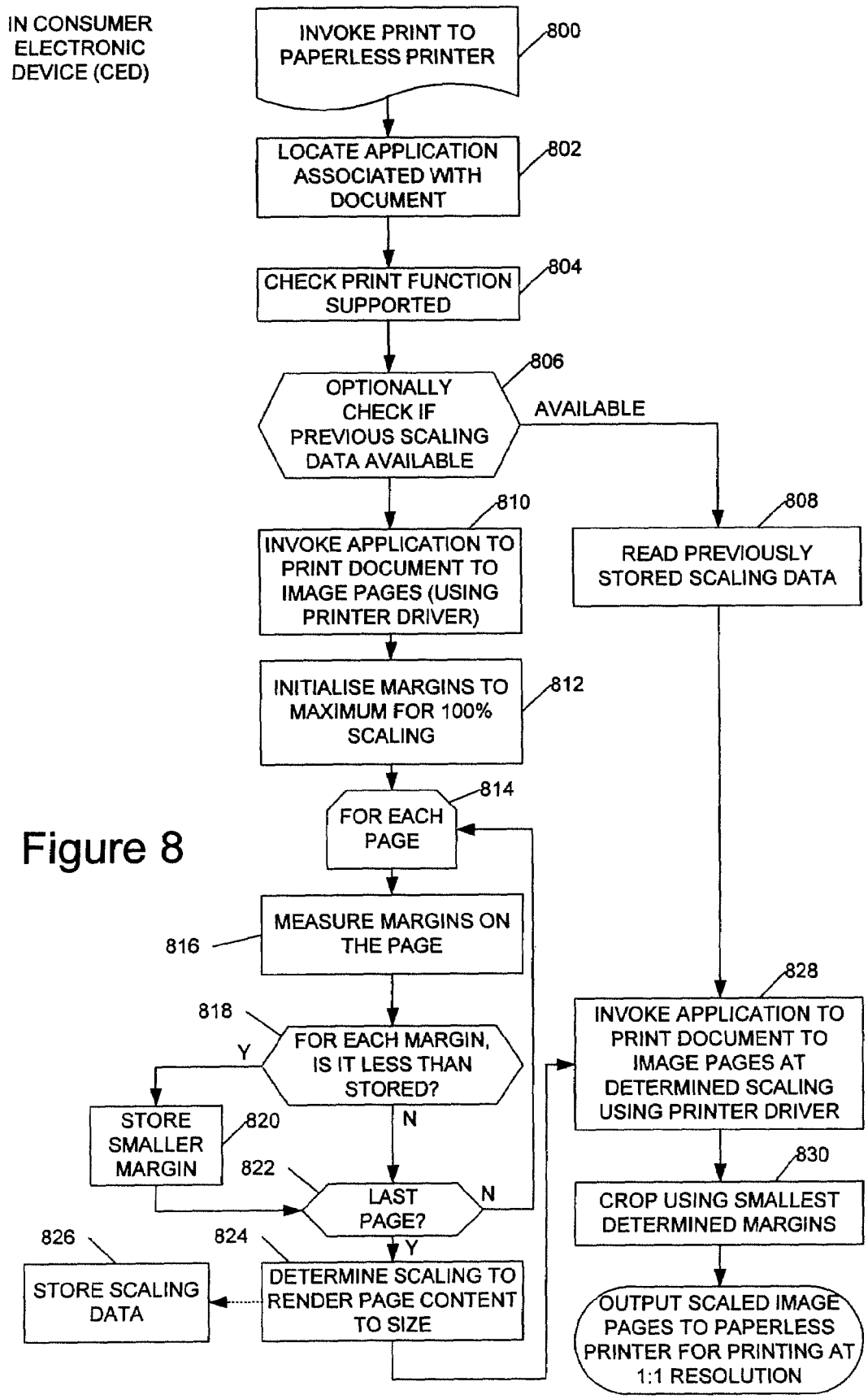
FIG. 8 shows a flow diagram of a procedure for establishing and applying a common scaling to pages of a document with multiple pages to fit the pages within a re-writeable display portion of an electronic document reader.

Referring now to FIG. 8, this shows a flow diagram of a procedure to enable use of the processing power of a "host"

consumer electronics device to render, re-scale and crop page data, providing images of pages for direct display on an electronic document reading device (paperless printer), thus substantially reducing the processing burden on the display device. This in turn facilitates achieving extremely long battery life times in the "printer".

In the procedure of FIG. 8, a document 800, either stored locally or received from a remote source, is used to invoke a "print" function on the paperless printer (this is described further below). The procedure then locates an application associated with the document (802) and checks (804) that a print function is supported for this type of document (if it is not an error message can be displayed). The procedure then optionally checks if previous scaling data is available, for example determined from another document previously printed by the same user. If this information is available the procedure reads the information from non-volatile memory (808); otherwise the procedure continues, and determines a scaling to employ.

Thus at step 810 the procedure invokes the relevant application for the document to print the document using a printer driver to a set of image pages, preferably at a resolution of the paperless printer (electronic document reading device), for example in one embodiment 1280 x 1220. The procedure then initialises a set of margin sizes for left, right, top and bottom margins to a set of maximum values (for 100% scaling), at step 812. Then, for each page (814) the procedure measures the margins on the page (816) as shown in FIG. 7 and, for each margin (818) determines whether or not the margin is less than the relevant stored value, updating the stored value (820) if the measured margin is smaller, and continuing (822) until the last page is reached. The procedure then uses the smallest margin values to determine a scaling which is to be applied to all of the pages so that one or more pages with a smallest margin size fit within the re-writeable portion of the display (824). Optionally this scaling data is stored, optionally together with a user identification (826) for later use in printing a second document without repeating the scaling procedure.

The procedure then invokes the application for the document a second time to "print" to image pages at the determined scaling using the printer driver, providing the desired scale as an input to the print-to-image driver. The management program then crops the images using the smallest determined margins (830), the result of this again being images of pages at substantially the same resolution as that of the electronic document display device (paperless printer), for example 1280×920. These images are then sent to the electronic document reader for a "printing" (display) at 1:1 resolution, thus substantially reducing the processing burden within the electronic document reading device. The scaled "printing" at step 828 can straightforwardly implement advanced functions such as anti-aliasing and font hinting (for grey scale fonts) since these functions are performed by a printer driver for the application. Thus, broadly speaking, a result of the procedure is to strip off margins, the same size for each page, in which no information content is present and then to stretch the resulting page, automatically scaling fonts and performing functions such as hinting, to match a target resolution for the paperless printer.

The skilled person will appreciate that there are many ways in which to transfer the image data to the paperless printer, for example providing the information directly to the device or as part of a synchronisation routine to synchronise content in one or both directions between the consumer electronic device and the paperless printer. The paperless printer, in embodiments, stores actual images of pages rather than data defined in the content of a page at some higher level. In this context an image of a page comprises a map with a pixel value defining the pixel colour, grey scale, or black/white level, for substantially each pixel of the re-writeable display portion of the paperless printer. This image data may be compressed, for example according to a lossless technique. Surprisingly an image of a page typically occupies only 10-20 KB and is thus not significantly less efficient then page data represented in a higher level format such as ASCII once additional formatting data is taken into account. Thus non-volatile memory in the paperless printer may store tens of thousands of pages.

Figure 9:
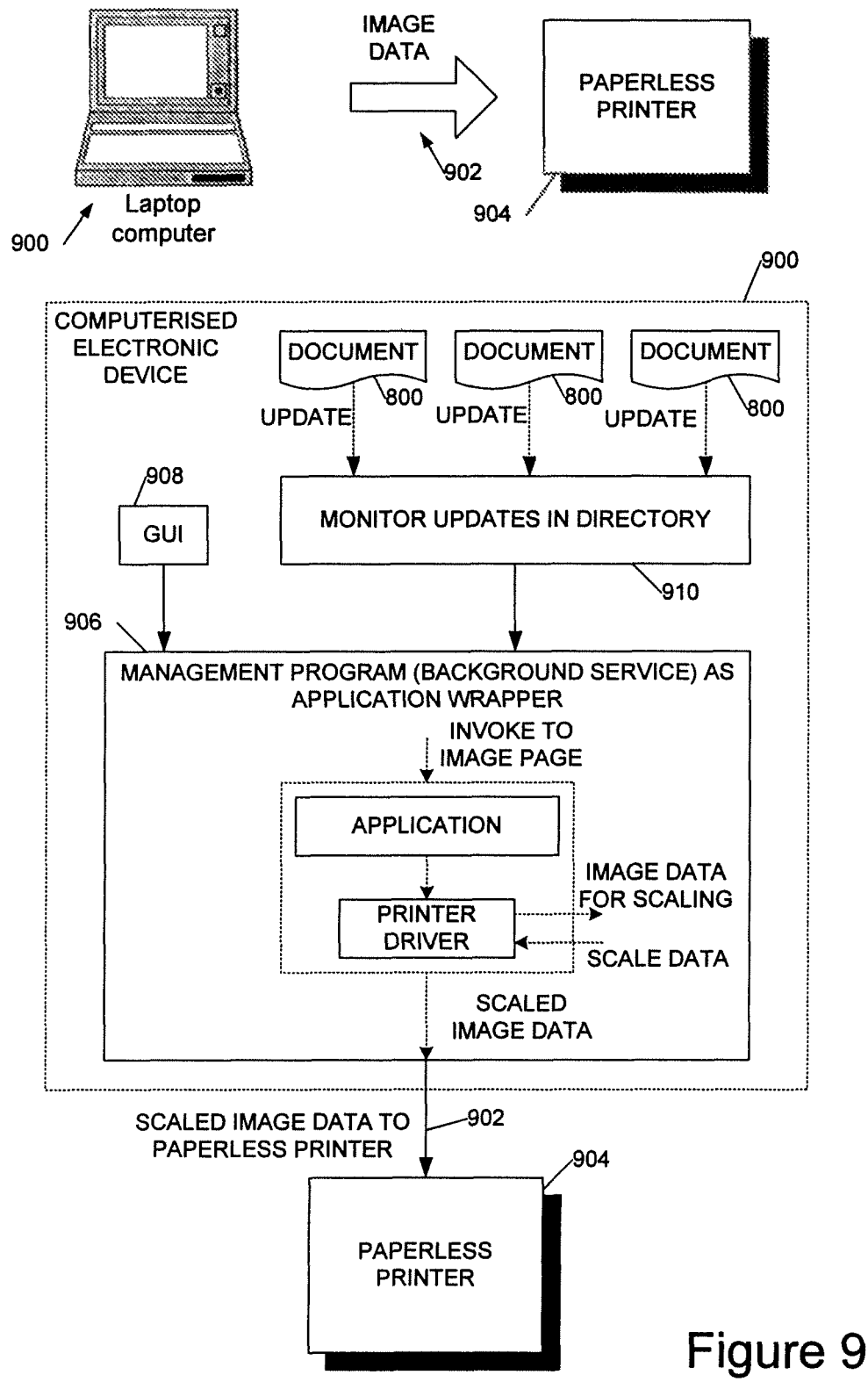
FIG. 9 shows a block diagram of a system for implementing a paperless electronic document printing procedure.

Referring next to FIG. 9, this shows more details of how elements of the procedure of FIG. 8 are distributed between different software modules and implemented. Thus the procedure of FIG. 8 in the example of FIG. 9 is implemented on a laptop computer 900, although it will be understood that other types of computerised electronic device may also be employed including, but not limited to, a PDA (personal digital assistant) and a mobile phone. Page image data 902 at a resolution substantially equal to that of a resolution of the paperless printer is sent to the paperless printer 904 for display. Optionally (not shown in FIG. 9) information such as annotation data representing user annotations on a paperless printer document may be transferred back from paperless printer 904 to consumer electronic device at 900, for example as part of a synchronisation procedure.

In preferred embodiments, the management program 906 runs as a background service on the device 900, hidden from a general user. A graphical user interface 908 is provided, for example on a desktop of device 900, to allow a user to setup parameters of the paperless printing mechanism, although in preferred embodiments the "printing" itself happens automatically. That is, in some preferred embodiments a system 910, for example provided by an operating system of device 900, monitors one or more directories for changes in documents 800 and on detection of a change informs the management program 906. This then automatically invokes a synchronisation procedure to provide an update document image, using the technique described above. In this way the management program automatically "prints" documents (or at least a changed part of a document), in a visual, image format, to the electronic reader when a document changes. The image information is stored on the electronic reader although it need not be displayed immediately. This sync update can be quick, in part because the processing is performed on the host. Optionally a drag-and-drop interface may also be provided for a user so that when a user drags and drops a document onto an appropriate icon the management program provides a (transparent) paperless print function for the user.

Thus in one embodiment in a Windows (registered Trademark) environment the management program opens a hidden desktop (a Windows function) and then opens the relevant application for the document in the hidden desktop. The application is run to process the document and print the document using a printer driver to print to an image file. This image file is then parsed by the management program 906 which determines a scaling, and then the document is reprinted at the determined scaling (if a scaling is known the initial parsing procedure may be omitted). The management program then crops the scaled image data and outputs image data at a pixel resolution suitable for the paperless printer 904, for printing without further rendering. Thus when the documents is wanted for display on the paperless printer, minimal further processing is necessary.

This technique may be used for a range of programs including, for example, Microsoft Word, Microsoft Outlook, Internet Explorer (all Registered Trademarks) and the like. For other programs, for example XL2007 (Registered Trademark) rather than opening a hidden desktop the application may be invoked by the management program 906 by running a script. Similar approaches may be adopted in other operating systems, for example Apple Mac computers based on a Unix-type operating system.

The skilled person will understand that, in the specification, "document" is used broadly since the techniques we describe are applicable to any information on a page, not just words, including for example, pictures, music and in general any material which may be printed to a page. Thus references to pages of a document are to be interpreted broadly and may include, for example, web pages, e-mails, image pages and many other types of document, for example music scores. It will also be understood that embodiments of the device we describe may be used for writing as well as reading, for example to annotate a page which is being read.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. A method of displaying a document comprising a plurality of document pages using a display device having a central re-writable display portion and a non-re-writable border, each of said document pages comprising a central, foreground portion bearing one or both of text and graphics, and at least one margin, the method comprising:
inputting page data defining said document for display to a management program;
automatically processing said page data, using said management program to determine a margin size of said at least one margin for each of said plurality of document pages;
identifying a smallest margin size from said predetermined margin sizes, wherein said smallest margin size determines the amount which can be safely cropped from each of said at least one margin of said plurality of documents;
cropping margins of each of said plurality of document pages using said smallest margin size; and
outputting said cropped page data for display on said re-writable display portion of said display.

2. A method as claimed in claim 1, wherein said lateral dimensions of the display device are within 1 cm to that of a standard paper size, in particular ISO 216 or ANSI/ASME Y14.1.

3. A method as claimed in claim 1, wherein said central foreground portion displayed on said central rewritable portion extends to a distance of less than 5 mm away from the non-rewritable border.

4. A method as claimed in claim 1 wherein said display device includes a display device computer system to drive said display, and wherein said processing of said page data is performed in a host computer system separate to said display device computer system, said host computer system also generating said page data for processing.

5. A method as claimed in claim 4, wherein said host computer system comprises a laptop computer, desktop computer, Personal Digital Assistant (PDA), mobile telephone or smart telephone.

6. A method as claimed in claim 1, wherein said central re-writable display portion comprises an electrophoretic display element.

7. A method as claimed in claim 1, wherein processing said page data further comprises formatting a layout of one or both of said text and graphics of said document page such that said text and graphics are displayable on said re-writable display portion.

8. A method as claimed in claim 1, wherein said outputting of said cropped page data comprises outputting page image data.

9. A method of formatting a document for display on an electronic document reader having a non-rewriteable border adjacent a re-writable display portion, the method comprising:
inputting page data for a plurality of pages of said document for display on said electronic document reader to a management program;
automatically processing said page data using said management program to determine, for each of said plurality of pages, a margin size of at least one margin of each of said pages;
identifying, using said management program, a smallest margin size from amongst said determined margin sizes, wherein said smallest margin size determines the amount which can be safely cropped from each of said at least one margin of said plurality of documents;
scaling, using said smallest margin size, said page data for display on said re-writable display portion; and
cropping, using said smallest margin size, each of said plurality of document pages in said page data to generate cropped page data such that when said cropped page data is displayed on said re-writable display portion, said non-re-writable border becomes said margins.

10. A method as claimed in claim 9 wherein said scaling comprises scaling said page data such that a page with said smallest margin size substantially completely fills said re-writeable display portion when said margin is discounted.

11. A method as claimed in claim 9 wherein said page data comprises an image of each said page.

12. A method as claimed in claim 11 wherein said margin comprises an edge region of a said page in which there is substantially no difference in information content between said pages of said plurality of pages.

13. A method as claimed in claim 9 wherein said border is present on four sides of said re-writable display portion, and wherein said method determines a said margin size, and identifies a said smallest margin size, for top, bottom, left and right margins of said pages.

14. A method as claimed in claim 9 further comprising learning a said scaling to apply to said page data from one said document for display and applying a learnt said scaling to a second said document for display.

15. A non-transitory carrier carrying processor control code to, when running, implement the method of claim 9.

16. An electronic document reader having a non-rewriteable border adjacent a re-writable display portion, the electronic document reader further comprising:
an input to receive page data for a plurality of pages of said document for display on said electronic document reader;
non-volatile memory for storing said page data;
program memory for storing processor control code for controlling said electronic document reader;
a display for displaying a said page of said document; and
a processor coupled to said non-volatile memory to said program memory, to said input, and to said display, and wherein said processor control code is configured to control said processor to:

process said page data to determine, for each of said plurality of pages, a margin size of at least one margin of each of said pages;

identify a smallest said margin size from amongst said determined margin sizes of said plurality of pages, wherein said smallest margin size determines the amount which can be safely cropped from each of said at least one margin of said plurality of documents;

scale, using said smallest margin size, said page data for display on said re-writable display portion;

crop, using said smallest margin size, each of said plurality of pages of said page data to generate cropped page data such that when said cropped page data is displayed on said re-writable display portion, said non-re-writable border becomes said margins, and provide said scaled and cropped page data for displaying on said display.

17. An electronic document reader as claimed in claim 16 wherein said processor control code is configured to scale said page data such that a page with said smallest margin size substantially completely fills said re-writeable display portion when said margin is discounted.

18. A method of formatting a document for display on an electronic document reader, the method comprising:

inputting page data for a plurality of pages of said document for display on the electronic document reader to a management program;

automatically processing said page data using said management program to determine, for each of said plurality of pages, a margin size of at least one margin of each of said pages;

identifying, using said management program, a smallest margin size from amongst said determined margin sizes, wherein said smallest margin size determines the amount which can be safely cropped from each of said at least one margin of said plurality of documents; and modifying, using said smallest margin size, each of said plurality of documents pages in said page data.

19. A method as claimed in claim 18, wherein said modifying comprises modifying each of said plurality of pages using said smallest margin size.

* * * * *

UNITED STATES PATENT AND TRADEMARK OFFICE
CERTIFICATE OF CORRECTION

PATENT NO. : 8,539,341 B2
APPLICATION NO. : 12/138835
DATED : September 17, 2013
INVENTOR(S) : Duncan Barclay Page 1 of 1

It is certified that error appears in the above-identified patent and that said Letters Patent is hereby corrected as shown below:

Title Page

Item (75) Inventors: Delete "Simon Joines," and insert -- Simon Jones, --, therefor.

Item (75) Inventors: Delete "Swaston (GB)" and insert -- Sawston (GB) --, therefor.

Signed and Sealed this
Twenty-ninth Day of April, 2014

Michelle K. Lee
*Deputy Director of the United States Patent and Trademark Office*